United States Patent
Lagerwey

(10) Patent No.: US 6,420,796 B1
(45) Date of Patent: Jul. 16, 2002

(54) DC LOCAL GRID FOR WIND FARM

(75) Inventor: Hendrik Lambertus Lagerwey, CT Kootwijkerbroek (NL)

(73) Assignee: Lagerway Windturbine BV, Barneveld (NL)

( * ) Notice: Subject to any disclaimer, the term of this patent is extended or adjusted under 35 U.S.C. 154(b) by 0 days.

(21) Appl. No.: 09/720,853

(22) PCT Filed: Jul. 2, 1999

(86) PCT No.: PCT/NL99/00418

§ 371 (c)(1),
(2), (4) Date: Feb. 20, 2001

(87) PCT Pub. No.: WO00/01946

PCT Pub. Date: Jan. 13, 2000

(30) Foreign Application Priority Data

Jul. 2, 1998 (NL) .............................................. 1009543

(51) Int. Cl.$^7$ ................................................ H02P 9/04
(52) U.S. Cl. ............................................ 290/44; 290/50
(58) Field of Search ............................ 290/44, 55, 52; 322/29; 416/197 A

(56) References Cited

U.S. PATENT DOCUMENTS 5,225,712 A 7/1993 Erdman ........................ 290/44
5,798,632 A * 8/1998 Muljadi ........................ 290/44
6,137,187 A * 10/2000 Mikhail et al. ............... 290/44

OTHER PUBLICATIONS

K.C. Kalaitzakis "Power management of grid–connected wind generator clusters" European Wind Energy Conference Oct. 22–26, 1984, pp. 696–701.

Hayakawa I, et al, "Utility–grid interactive three phase inverter system incorporating wind turbine–driven induction generator and PWM converter" 278H Universities Power Engineering Conference Proceedings Sep. 21–23, 1993, pp. 832–836.

D. Nasunin, "Wind energy recovery systems—Basici ideas and their realization" Proceedings of Melecon'87, 1987, pp. 617–621, no month.

* cited by examiner

Primary Examiner—Shawn Riley
(74) Attorney, Agent, or Firm—St. Onge Steward Johnston & Reens LLC

(57) ABSTRACT

A wind farm is described in which two or more windmills are provided with each having a generator to generate electrical power. The energy supplied by the generators is output to a general a.c. grid which is set at a standard voltage. The electrical power supplied by the windmills is injected into the a.c. grid via a d.c. interconnecting grid to which a plurality of windmills are linked and with a converter. The d.c. voltage in the d.c. interconnecting grid is set as a function of the electrical power to be generated by a generator.

10 Claims, 2 Drawing Sheets

DC LOCAL GRID FOR WIND FARM

FIELD OF THE INVENTION

This invention relates to a method and apparatus for generating electric power by means of a windmill in which a generator that is equipped with a rectifier feeds direct current to a common d.c. interconnecting grid. More specifically this invention relates to a windmill system in which two or more windmills supply d.c. power to a common d.c. interconnecting grid which in turn delivers the d.c. power to a converter that transforms the electrical power to alternating current that is then output onto an a.c. grid.

BACKGROUND OF THE INVENTION

U.S. Pat. No. 5,225,712 describes a method for supplying electrical power from one or more generators driven by a windmill to an a.c. grid. The a.c. power from the generators is converted to d.c. power and then applied to the a.c. grid through inverters. There is no common d.c. interconnecting grid described in the '712 patent and onto which the d.c. power from the respective generators is supplied.

In the '712 patent the level of the d.c. voltages developed from the generators is constant and independent of the speed of rotation of the generator or the wind speed. The efficiency of the generator at the various speeds of rotation is affected, inter alia, by the voltage output by the generator, which means that for a single setting of the level of the direct current the efficiency of the generator is unnecessarily low either at a high speed of rotation and wind speed or at a low speed of rotation and wind speed, unless the generator is fitted with special and expensive provisions to improve efficiency.

SUMMARY OF THE INVENTION

With a method and apparatus of the invention the d.c. voltage of a d.c. interconnecting grid is adjusted according to circumstances whereby the generator of the windmill is able to operate at a higher efficiency over its entire working range and can be of simpler design. Hence, with the ability to vary the voltage level of the d.c. interconnecting grid to, for example tailor it to the power being supplied by the generator, control over the various windmills used in a wind farm can be greatly simplified. This arises because a reduction in the d.c. voltage of the interconnecting grid enables the generator to also supply a lower voltage and deliver its power with a lower speed of rotation of the windmill and with a higher efficiency.

The adjustability of the voltage of the d.c. interconnecting grid enables the generator to deliver electrical power on the basis of wind speed and thus maximizes efficiency at all wind speeds. With the voltage of the interconnecting grid set on the basis of wind speeds encountered by the windmills and the speeds of rotation of the respective generators. This is particularly advantageous when the windmills are spaced far apart and/or local condition vary rapidly.

Cost savings can be obtained with a method and system of this invention by drawing electrical power for driving local equipment at the respective windmills from the same or common electrical cable of the d.c. interconnecting grid. This electrical power can then be transformed into a.c. when such power is required by local equipment.

Special components and techniques can be advantageously provided to intermittently store energy to enable one to safely stop a windmill when this is needed. Use of a common d.c. interconnecting rid enables a convenient source of electrical power from the a.c. output grid with the use of a power converter to startup the windmills in the farm, for example during a lull in the wind.

The invention is explained hereinafter with reference to a particular embodiment with the aid of an embodiment shown in the drawings.

DETAILED DESCRIPTION OF DRAWINGS

Figure 1:
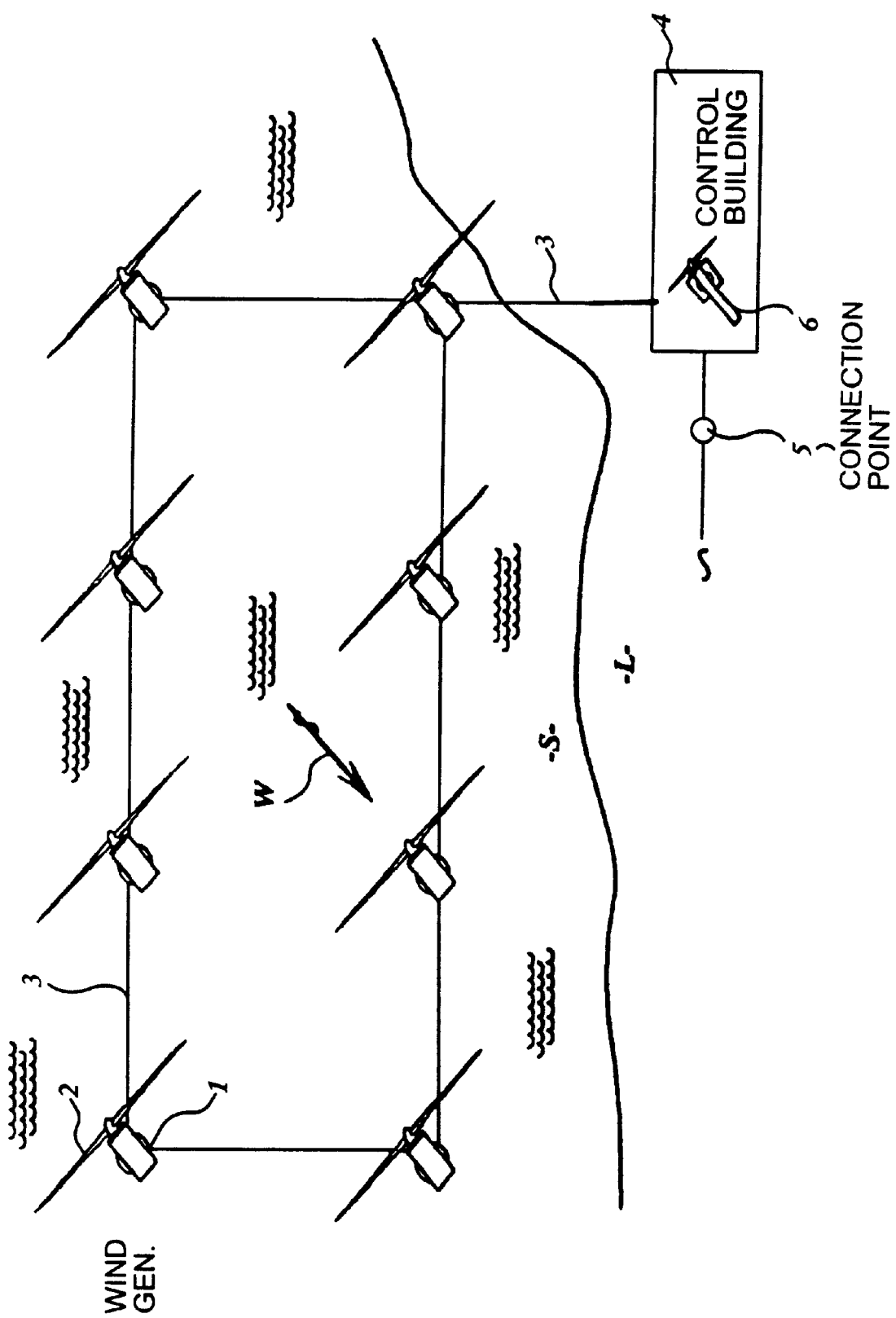
FIG. 1 depicts a schematic top view of a wind farm.

Corresponding components have been assigned, as far as possible, the same reference numeral.

FIG. 1 shows the top view of a wind farm comprising eight windmills 1, each provided with vanes 2 whose rotary shaft points towards the prevailing wind direction W. The windmills are set in water S and are connected to one another and to a control building 4 via a d.c. interconnecting grid 3. The control building 4 is located on dry land L. From the control building 4 a cable runs to an interconnection point 5 and thence to a public A.C. grid (not shown in any detail). Situated on top of the control building 4 is a wind direction- and wind speed-measuring instrument 6.

Figure 2:
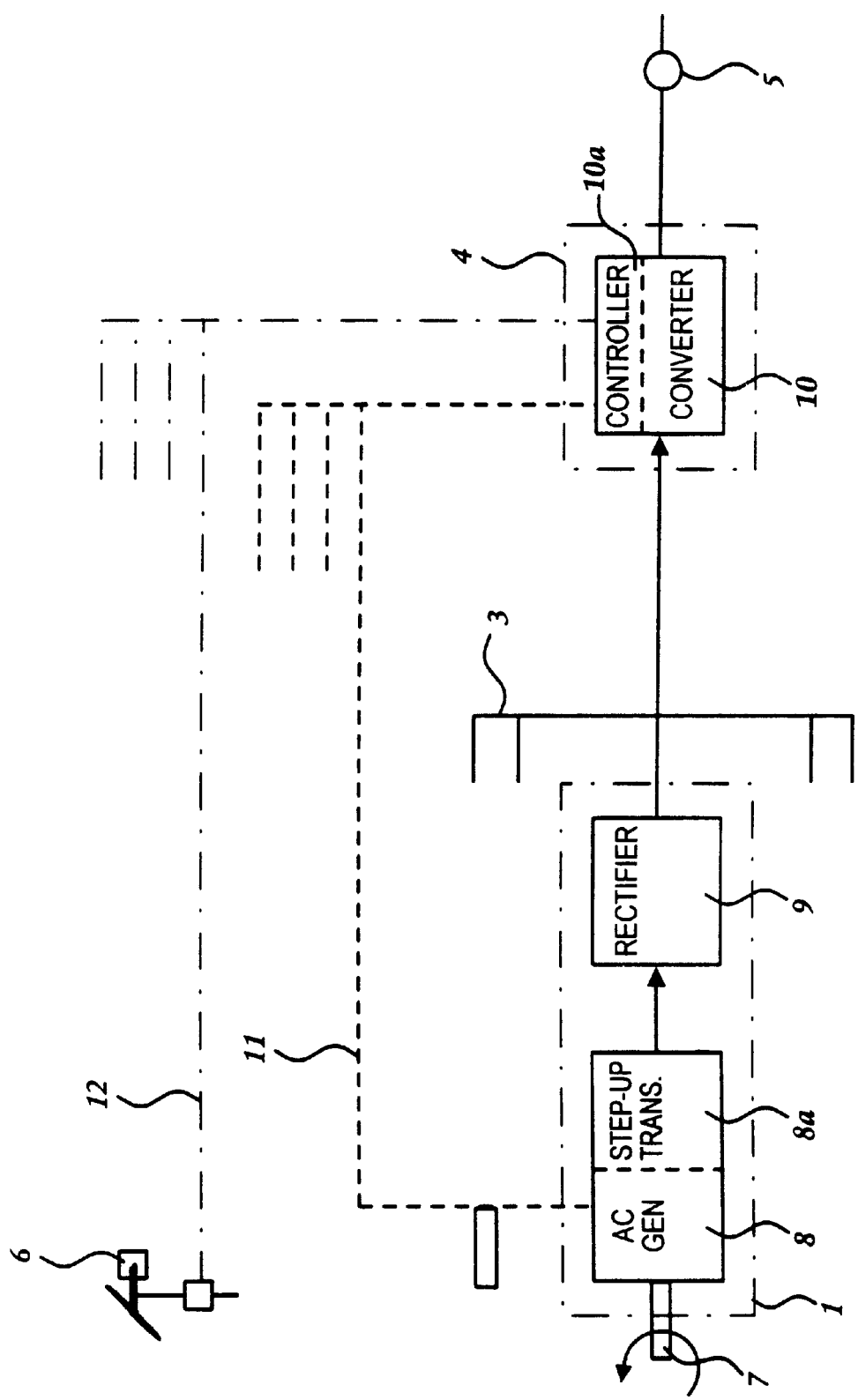
FIG. 2 is a schematic depiction of various components used in the invention.

FIG. 2 schematically depicts the various components. Incorporated in the schematically depicted windmill 1 an a.c. generator 8, which may be provided with a step-up transformer 8a and a rectifier 9. The generator 8 is driven by a rotary shaft 7 to which the vanes 2 are attached (but are not shown in any detail). Also fitted can be a revolution counter for measuring the speed of rotation of the rotary shaft 7 and thus of the generator 8.

In addition to the components shown here, the windmill 1 inter alia also incorporates a capstan drive of the vanes 2, as well as a controller for the generator 8, if this is required for the particular generator type. The windmill 1 is further provided with means for adjusting the pitch angle of the vanes 2, in order to effect, where necessary, a lower efficiency of the vanes 2 at high wind speeds, thus avoiding an excessive speed of rotation of the windmill 1.

The generator 8 can be a field-controlled a.c. generator or an a.c. generator equipped with permanent magnets. If field control is used, a separate controller is present for this purpose in the windmill 1. The windmill 1 further includes known means for signalling that the windmill I in question is in use, said signal being relayed to a controller 10a via a link 11. In another embodiment, the generator 8 can be designed as a d.c. generator including the provisions necessary for this purpose. In that case, a separate rectifier 9 is unnecessary although there are then additional provisions to prevent the undesirable situation where the vanes 2 would be driven by the generator 8.

Positioned in the control building 4 is converter 10 for converting the energy supplied to the d.c. interconnecting grid 3 into constant-voltage alternating current which, via the interconnecting point 5, is fed into the public a.c. grid. The converter 10 is connected to the d.c. interconnecting grid 3, to which the rectifiers 9 of the various windmills 1 are linked. The length of the cables of the d.c. interconnecting grid 3 can, without any difficulties, be from a few kilometres to tens of kilometres, so that the windmills 1 can be situated at as favourable a location as possible in the water S, and the control building 4 can be on land L. The length of the cables in the d.c. interconnecting grid 3 does not affect the potential to transport energy, in contrast to the situation with an a.c. interconnecting grid.

The controller 10a is fitted on the converter 10 to control the converter 10. By means of the controller 10a, the converter 10 is driven in such a way that the voltage level in the d.c. interconnecting grid 3 is maintained at an adjustable constant value. The controller 10a is connected to the windmills via the link 11, and to one or more wind direction- and wind speed-measuring instruments 6 which are located near the windmills 1. The wind direction- and wind speed-measuring instruments 6 are connected to the controller 10a via a cable 12 along which the wind data are carried. Optionally, these instruments may also be located on a few, for example three, windmills 1.

In the controller 10a it is established what the voltage level in the d.c. interconnecting grid 3 must be. This voltage level may depend on the wind speed which has been measured by means of the anemometers 6. The voltage level may also depend on the rotary shaft 7 speed of rotation which, as measured by the revolution counter, gives an indication of the wind speed around a windmill 1 in question. Preferably, the measured values of wind speed and/or speed of rotation are averaged for the various measurements for the windmills 1 as linked to the d.c. interconnecting grid. As a result of a particular d.c. voltage prevailing in the d.c. interconnecting grid 3, all the generators 8 linked via a d.c. interconnecting grid 3 produce the same d.c. voltage and therefore operate in the same operating range of the generator 8. Since the windmills 1 are located in each others vicinity and will encounter more or less the same wind speed, they will all be able to operate at their most efficient operating point, which allows the highest efficiency to be achieved in a simple manner at any wind speed.

In those situations where the wind speed is high the rotary shafts 7 of the windmills 1 will rotate at the maximum permissible speed of rotation of the vanes 2. This speed is determined, inter alia, by the aerodynamic requirements and permissible load for which the vanes 2 have been designed. At the maximum speed of rotation, the vanes 2 will also provide maximum power, and the generator 8 will likewise have to be able to output its maximum power. This is what determines the highest level of the d.c. voltage in the d.c. interconnecting grid 3. If the wind rises further, the speed of rotation of the vanes 2 must not or virtually not increase, and the power to be output by the generator 8 will only be capable of being increased by an increase in the current intensity. The d.c. voltage in the d.c. interconnecting grid will not increase. In that situation, the vanes 2, if the wind rises further, will have to work at lower efficiency, which is achieved by the known (but now shown) vane adjustment. The generator 8 is of such design that its efficiency is highest at maximum power and speed of rotation.

To ensure that in situations with less wind the efficiency of the generator 8 is nevertheless as high as possible, it is important to lower the voltage at which the generator 8 has to operate, which is effected by reducing the voltage level of the d.c. interconnecting grid 3. This is done in the converter 10 which is controlled for this purpose by the controller boa on the basis of the information from the anemometers 6 or the revolution counter. To achieve effective control of this voltage it may be of interest, moreover, to know how many on-stream windmills 1 are connected to the d.c. interconnecting grid 3. Via a link 11, each windmill 1 is connected to the controller 10a, for example to indicate whether the windmill 1 is supplying current and, for example, to indicate the speed of rotation of the rotary shaft 7.

The link 11 is shown in FIG. 2 as a separate link used for transmitting information regarding the operation of the windmills 1 to the control building 4. The link 11 can also be used for transmitting control data to the windmills 1, such as wind direction data which are calculated on the basis of the data from the wind direction measuring instruments 6. This information is used to point the windmills 1 in the wind direction W, avoiding an arrangement where each windmill 1 is fitted with failure-prone wind direction measuring instruments. The cable for transmitting the information can be designed as an optical cable, there being a facility in the windmills 1 which stops the windmill when the link is broken.

According to another embodiment, the link 11 can be implemented as a signal present on the d.c. interconnecting grid 3, the d.c. interconnecting grid 3 acting as a network and each windmill 1 extracting from the network the signal intended for said windmill. According to one embodiment, separate facilities may be provided to ensure that the windmills 1 are always positioned correctly with respect to the wind direction W, i.e. when they are operational they are pointing in the wind direction W and when they are turned off they are at right angles to the wind direction W, so that the vanes 2 capture as little wind as possible. To this end, each mill is provided with the capstan drive (not shown), which is supplied, for example, from the d.c. interconnecting grid 3, possibly via a converter, and which is driven via the link 11.

The above-described embodiment can be implemented using windmills 1 each having a maximum capacity of, for example, 0.5–1.0 megawatts. The d.c. interconnecting grid 3 will have a voltage, at that capacity, of 25,000 volts d.c. In the mill, the a.c. generator 8 then generates, via the step-up transformer 8a, a three-phase a.c. voltage of about 20,000 volts, the rotary shaft 7 of the generator turning at 18–30 revolutions per minute.

As well as in accordance with the above-described specific embodiment, the various components can be of some other, known design. As well as the previously described a.c. generator 8, for example, a d.c. generator can be used instead, which is likewise provided with a controller by means of which the behaviour of the generator is tailored to the voltage level in the d.c. interconnecting grid 3.

In the previously described specific embodiment it was described how the energy generated by the generator 8, which energy may, for example, amount to many hundreds of kilowatts, is transported to the interconnection point 5. Present in the windmill 1 is not only energy-generating equipment such as the generator 8, but also energy-consuming equipment such as a drive for adjusting the vanes 2, and a capstan drive for turning the rotary shaft 7 of the vanes 2 into the wind direction W. These drives together do not consume more than, for example, from a few up to tens of kilowatts. The controller of the windmill 1 and the equipment present in it likewise require energy. To provide this energy, the windmill 1 includes an a.c. grid to which the various drives and equipment can be linked.

This a.c. grid can be fed in various ways. During normal operation of the windmill 1, the a.c. grid can be fed from one or more windings in the generator 8, energy at the same time being fed to one or more storage batteries for the situation where the generator 8 is at a standstill. In this arrangement, the storage batteries are sufficiently large for it to be possible to use them, after the generator 8 has come to a standstill, to turn the rotary shaft 7 of the vanes 2 by means of the capstan drive in the direction of the wind, so that the mill will start to turn again. Optionally, there is also enough energy for setting the vanes at the correct pitch angle and for emergency lighting while work is being carried out on the windmill 1. Instead of electrical storage batteries it is also possible to use hydraulic accumulators in conjunction with a hydraulic drive.

A second way of feeding the a.c. grid in the windmill 1 is to position a converter between the d.c. interconnecting grid 3 and the a.c. grid, by means of which the d.c. voltage is converted into a.c. voltage. In such an arrangement, the said converter must be suitable for converting a d.c. voltage of many thousands of volts into three-phase a.c. voltages of, for example, 380 volts at an output of about ten kilowatts. Thus a.c. voltage will always be present in the windmill 1 as long as there is a voltage in the d.c. interconnecting grid 3.

A third way of feeding the a.c. grid into the windmill 1 is to use an engine-generator unit which is switched on if required.

A fourth way is to connect the a.c. grid to the interconnection point 5 via cables and possibly transformers.

The above describes each windmill 1 having its own a.c. grid. Alternatively, however, the a.c. grid of two or more windmills 1 can be connected to one another to form a local a.c. grid which can optionally be connected, in a previously described manner, to the interconnection point 5. This local a.c. grid can, if required, be provided with energy in any of the ways described above for the a.c. grid in the windmill 1.

What is claimed is:

1. A method for generating electric power by means of a plurality of windmills (1) each being provided with a generator (8) and a rectifier (9) for feeding direct current to a common d.c. interconnecting grid (3), the electrical d.c. power from the windmills 1) being conducted via the common d.c. interconnecting grid (3) to a converter (10) and in the converter (10) being converted into alternating current and output to an a.c. grid (5) characterized by the step of setting the common d.c. voltage in the d.c. interconnecting grid (3) from the respective rectifiers at a common level selected to generate the electrical power from the plurality of windmills with an optimum efficiency.

2. Method according to claim 1, characterized in that a wind speed signal indicative of wind speed at the windmills is produced and wherein the d.c. voltage for the common d.c. interconnecting grid is set on the basis of the wind speed signal.

3. Method according to claim 1, characterized in that the wind speed signal is generated from a sensing of the speed of rotation of at least one of the windmills.

4. Apparatus for generating electrical power, comprising:

two or more windmills (1) each windmill being provided with a generator (8), including a rectifier (9) for supplying direct current on an output line;

a converter to convert d.c. power to a.c. power;

a common d.c. interconnecting grid (3) connected to output lines of respective rectifiers for conducting d.c. electrical power generated by the respective windmills to said converter; said converter supplying a.c. power for an a.c. grid (5); and means (10, 10a), remotely located from said windmills, for setting the d.c. voltage in the d.c. interconnecting grid (3) for respective rectifiers.

5. Apparatus according to claim 4, characterized in that sensors for detecting wind speed and producing a wind speed signal indicative thereof are provided; and wherein said means (10, 10a) for setting the voltage in the common d.c. interconnecting grid is controlled by said wind speed signal.

6. Apparatus according to claim 4, characterized in that the means (10, 10a) for setting the d.c. voltage in the common interconnecting d.c. grid include one or more sensors (6) for detecting the speed of rotation of either one or a number of windmills (1).

7. Apparatus according to claim 4, characterized in that a windmill (1) is provided with means for converting electrical power present in the common d.c. interconnecting grid (3) into a form which can be used by equipment in the windmill (1).

8. Apparatus according to claim 4, characterized in that a windmill (1) is provided with means for temporarily generating energy in a form which can be used by equipment in the windmill (1).

9. Apparatus according to claim 4, characterized in that a windmill (1) is provided with means for intermittently storing energy for the purpose of stopping the windmill safely.

10. Apparatus according to claim 4, characterized in that conversion means are provided for feeding electrical energy present in the a.c. grid (5) to the common d.c. interconnecting grid (3).

* * * * *